United States Patent
Pinder et al.

(10) Patent No.: US 11,481,225 B2
(45) Date of Patent: Oct. 25, 2022

(54) APPARATUS AND METHODS TO DISPLAY THE STATUS OF AN ANCILLARY EMBEDDED SYSTEM

(71) Applicant: MOTOROLA SOLUTIONS, INC., Schaumburg, IL (US)

(72) Inventors: Ellis A. Pinder, Davie, FL (US); Matthew E. Simms, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1631 days.

(21) Appl. No.: 14/850,517

(22) Filed: Sep. 10, 2015

(65) Prior Publication Data

US 2017/0075696 A1    Mar. 16, 2017

(51) Int. Cl.
G06F 9/4401 (2018.01)
G06F 3/0481 (2022.01)
G06F 3/0482 (2013.01)
G06F 3/04847 (2022.01)

(52) U.S. Cl.
CPC .......... *G06F 9/4403* (2013.01); *G06F 3/0481* (2013.01); *G06F 3/0482* (2013.01); *G06F 3/04847* (2013.01)

(58) Field of Classification Search
CPC .... G06F 9/4401; G06F 9/4403; G06F 9/4406; G06F 9/441; G06F 9/445
See application file for complete search history.

(56) References Cited

U.S. PATENT DOCUMENTS 5,678,046 A * 10/1997 Cahill .................. G06K 9/033
                                                                        707/829
6,173,445 B1    1/2001 Khan et al.
(Continued)

FOREIGN PATENT DOCUMENTS

EP    2304539    4/2011
EP    2746935    6/2014
WO    2009/152910    12/2009

OTHER PUBLICATIONS

Splashy Project archived by the Internet Wayback Machine in 2008 downloaded from https://web.archive.org/web/20080701132319/http://splashy.alioth.debian.org:80/wiki/ https://web.archive.org/web/20080517113042/http://splashy.alioth.debian.org/wiki/history . . . (Year: 2008).*

(Continued)

*Primary Examiner* — Alvin H Tan
(74) *Attorney, Agent, or Firm* — Michael Best & Friedrich LLP

(57) ABSTRACT

A method and apparatus for indicating the status of an ancillary embedded system in an electronic device. In one exemplary embodiment, the method includes starting an initialization process of a high-level embedded system in the electronic device. The method further includes determining the status of the ancillary embedded system. The method further includes generating display information for the status of the ancillary embedded system. The method further includes storing the display information in a manner retrievable by the high-level embedded system. The method further includes reading the stored set of display information and displaying an indication of the status on a user display prior to completion of the high-level embedded system's initialization process. The method further includes periodically updating the stored set of display information by the ancillary embedded system to provide a real-time indication of status.

19 Claims, 3 Drawing Sheets

(56) References Cited

U.S. PATENT DOCUMENTS

| | | | |
|---|---|---|---|
| 6,178,503 B1 | 1/2001 | Madden et al. | |
| 7,536,537 B2 | 5/2009 | Linn | |
| 7,689,820 B2 | 3/2010 | Pierce et al. | |
| 8,874,097 B1* | 10/2014 | Warsaw | H04W 88/06 455/418 |
| 9,928,078 B2* | 3/2018 | Jung | G06F 9/4403 |
| 10,318,328 B2* | 6/2019 | Lee | G06F 9/45545 |
| 2013/0029633 A1* | 1/2013 | Moser | H04W 4/22 455/404.1 |

OTHER PUBLICATIONS

"Fast IPC Communication Using Shared Memory" on CodeProject published Sep. 28, 2006, archive by the Internet Wayback Machine downloaded from https://web.archive.org/web/20120209001931/ https://www.codeproject.com/Articles/14740/Fast-IPC-Communication-Using-Shared-Memory-and-Int (Year: 2006).*

Office Action from the Canadian Intellectual Property Office for Application No. 2938683 dated May 11, 2018 (4 pages).

Office Action from the Canadian Intellectual Property Office for Application No. 2938683 dated Jun. 21, 2017 (4 pages).

Canadian Office Action dated Apr. 15, 2019 for corresponding Canadian Application No. 2,938,683 (6 pages).

Canadian Patent Office Action dated Mar. 10, 2020 for related Canadian Application No. 2,938,683 (8 pages).

Canadian Patent Office Action for Application No. 2,938,683 dated Nov. 17, 2020 (9 pages).

* cited by examiner

APPARATUS AND METHODS TO DISPLAY THE STATUS OF AN ANCILLARY EMBEDDED SYSTEM

BACKGROUND OF THE INVENTION

Some electronic devices, including communication devices, incorporate multiple embedded systems of different types, for example, a high-level embedded system and an ancillary embedded system. The high-level embedded system may take a relatively long time to boot up (for example, thirty seconds or longer), while the ancillary system boots in a shorter period of time (for example, three to seven seconds). Because the high-level embedded system typically drives the main display of the electronic device, this disparity in boot times can cause problems for some users of the electronic devices.

For example, a communication device may incorporate components (for example, hardware and software) to permit communications via a land-mobile radio (LMR) network, a high-level embedded system, and an ancillary embedded system directed to managing the land-mobile radio communications. For certain types of users (for example, public safety personnel), land-mobile communications are a critical aspect of their use of the communication device. Those users prefer to know as quickly as possible whether it is feasible to operate on the land-mobile network, regardless of the status of the high-level embedded system. Continuing with the current example, when a police officer or other first responder powers up the communication device, the land mobile network may be available for use three seconds after power up, but the police officer will not be aware of this for at least another twenty-seven seconds due to the fact that the high-level embedded system controls notifications and takes longer to power up. Additionally, the police officer may not be able to view or change the channel or view radio status.

Accordingly, there is a need for systems and methods to display the status of an ancillary embedded system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
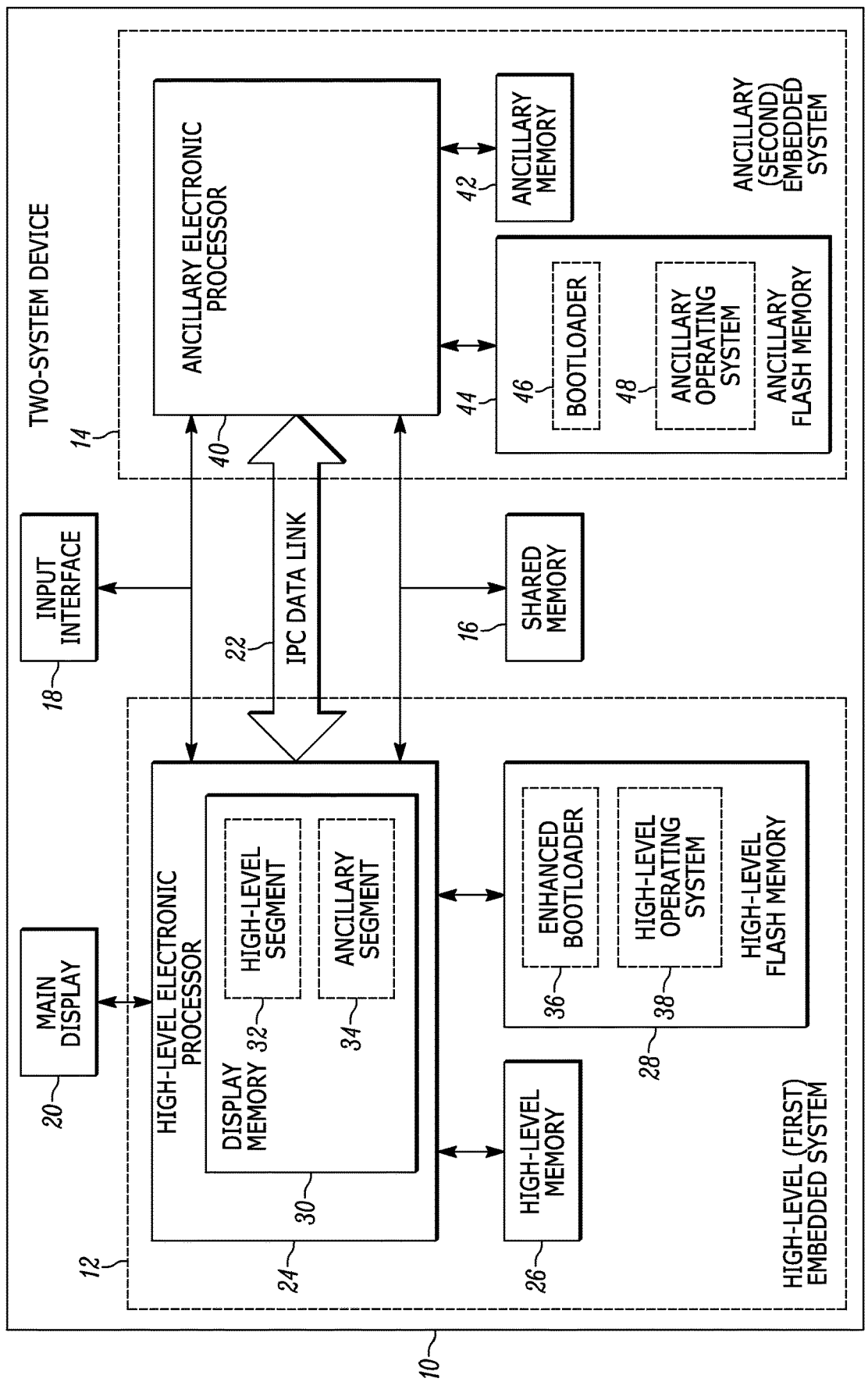
FIG. 1 is a block diagram of a two-system device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method for indicating the status of an ancillary embedded system in an electronic device. In one exemplary embodiment, the method includes starting an initialization process of a high-level embedded system in the electronic device. The method further includes determining the status of the ancillary embedded system. The method further includes generating display information for the status of the ancillary embedded system. The method further includes storing the display information in a manner retrievable by the high-level embedded system. The method further includes reading the stored set of display information and displaying an indication of the status on a user display prior to completion of the high-level embedded system's initialization process. In some embodiments, the method further includes periodically updating the stored set of display information by the ancillary embedded system to provide a real-time indication of status.

Some embodiments include an electronic device that indicates the status of a second embedded system of the electronic device. The device includes a user display, the first embedded system, and a second embedded system. The first embedded system runs a first operating system. The first operating system has a first boot time. The second embedded system runs a second operating system. The second operating system has a second boot time that is shorter than the first boot time. The second embedded system is configured to perform a user function after the start-up of the second embedded system is complete. The first embedded system is configured to cause the user display to display a status indication of the second embedded system after the start-up of the second embedded system is complete and before start-up of the first embedded system is complete. In some embodiments, the first embedded system is further configured to cause the user display to display real-time updates of the status indication during start-up of the first embedded system.

FIG. 1 is a block diagram of a two-system device 10 according to one exemplary embodiment. In certain embodiments, the two-system device may be a converged device. However, the systems and methods described herein are not limited to a converged device. In view of the description below, a person of ordinary skill in the art could implement embodiments of the invention in many different types of electronic devices that include multiple embedded systems where one embedded system boots more quickly than another embedded system.

It should be noted that, in the description that follows, the terms "high-level" and "ancillary" are used to distinguish between components included in the two-system device 10 that implement different modalities, for example, long term evolution (LTE) and land mobile radio (LMR). In addition, the terms "first" and "second" are also used in place of "high-level" and "ancillary." The terms, however, are not meant to imply that any of the components so labeled are superior or inferior to other components or arranged in a particular order. Nonetheless, in some embodiments the "ancillary system" is subordinate to the "high-level" system in the sense that the high-level embedded system 12 may control certain aspects of the two-system device 10 upon which the ancillary embedded system 14 depends.

The two-system device 10 includes a first or high-level embedded system 12, a second or ancillary embedded system 14, a shared memory 16, an input interface 18, a main display 20, and an inter-processor communication (IPC) data link 22. In some of the embodiments described herein, the two-system device 10 is a smart telephone capable of wireless communications via two or more modalities. However, in alternative embodiments, the two-system device 10 may be a portable radio, a mobile radio, or another electronic device that includes two or more embedded systems. In one exemplary embodiment, the high-level embedded system 12 includes hardware and software that allow the two-system device 10 to communicate wirelessly over long-term evolution (LTE) networks or similar networks. In addition, in the same exemplary embodiment, the ancillary embedded system 14 includes hardware and software that allow the two-system device 10 to communicate wirelessly within radio networks such as land-mobile radio (LMR) networks. The high-level embedded system 12, the ancillary embedded system 14, the shared memory 16, the input interface 18, and the main display 20 as well as other various modules and components, are coupled by one or more control or data buses, including the inter-processor communication data link 22, to enable communication therebetween.

The two-system device 10 may include other components, for example, an antenna, a transceiver, a land-mobile radio modem, a baseband modem, a subscriber identity module, a microphone, a speaker, and other processors and chipsets (not shown).

The shared memory 16 includes a data storage area (for example, a random access memory (RAM)) accessible to both the high-level embedded system 12 and the ancillary embedded system 14. The high-level embedded system 12 and the ancillary embedded system 14 are configured to read and write data to the shared memory 16 to exchange information between the embedded systems. In some embodiments, the shared memory space exists in the memory of one of the embedded systems, and is accessible to both systems.

The input interface 18 operates to receive user input (for example, selecting options or operations on the device). User input may be provided via, for example, a keypad, switches, a scroll ball, buttons, and the like. The input interface 18 communicates with the high-level embedded system 12 and the ancillary embedded system 14. In some embodiments, the input interface 18 includes a push-to-talk (PTT) button, for activating a land-mobile radio modem (not shown).

The main display 20 is operated by the high-level embedded system 12 to provide system output, to receive user input, or a combination of both. In some embodiments, the main display 20 is a liquid crystal display (LCD) touch screen. The main display 20 may include a graphical user interface (GUI) (for example, generated by the high-level embedded system 12 and presented on a touch screen) that enables a user to interact with the two-system device 10.

The high-level embedded system 12 includes a high-level electronic processor 24 (for example, a microprocessor or another suitable programmable device), a high-level memory 26 (for example, a computer-readable storage medium), and a high-level flash memory 28 (for example, a non-volatile computer-readable storage medium). The high-level electronic processor 24 is coupled to the high-level memory 26 and the high-level flash memory 28, and executes computer readable instructions ("software") stored in the high-level memory 26 and the high-level flash memory 28. The software may include one or more applications, program data, filters, rules, one or more program modules, and/or other executable instructions.

The high-level electronic processor 24 includes a display memory 30 (for example, random access memory (RAM)), which includes a high-level segment 32 and an ancillary segment 34. The high-level segment 32 and the ancillary segment 34 store display information created by the high-level electronic processor 24. The display information stored in the high-level segment 32 relates to the high-level embedded system 12. The display information stored in the ancillary segment 34 relates to the ancillary embedded system 14. In some embodiments, the ancillary segment 34 stores display information created by the ancillary embedded system 14. In some embodiments, the display information is a bitmap capable of being displayed on the main display 20.

The high-level memory 26 may include a program storage area (for example, read only memory (ROM)) and a data storage area (for example, random access memory (RAM)), and another non-transitory computer readable medium. The high-level flash memory 28 is a non-volatile, electrically-rewritable computer storage medium, which includes an enhanced bootloader 36 and a high-level operating system 38. In some embodiments, all or part of the enhanced bootloader 36 may be stored in a read only memory of the high-level memory 26.

In one embodiment, the high-level electronic processor 24 is configured to, upon power up, load the enhanced bootloader 36 into the high-level memory 26, and execute the enhanced bootloader 36. The enhanced bootloader 36 is configured to initiate start-up of the high-level embedded system 12 by retrieving the high-level operating system 38 from the high-level flash memory 28 and placing it into the high-level memory 26. The high-level electronic processor 24 is configured to read the high-level operating system 38 from the high-level memory 26 and boot the high-level operating system 38. In some embodiments, the high-level operating system 38 remains in, and is executed from, the high-level flash memory 28. In one exemplary embodiment, the enhanced bootloader 36 operates to read and write data to and from the high-level embedded system 12 and the ancillary embedded system 14 via the inter-processor communication data link 22. In alternative embodiments, the enhanced bootloader 36 operates to read and write data from the shared memory 16. The enhanced bootloader is further configured to process the data, create display information to store in the display memory 30, and display the display information on the main display 20.

In some embodiments, the high-level operating system 38 is an advanced operating system (for example, a Unix operating system variant). Before the high-level embedded system 12 can be used, it must boot. The boot time for the high-level operating system 38 (that is, the time between power up and when the high-level operating system 38 is ready for operation) is, for certain operating systems, for example, thirty seconds or longer.

The ancillary embedded system 14 includes an ancillary electronic processor 40 (for example, a microprocessor or another suitable programmable device) coupled to an ancillary memory 42 (for example, a computer-readable storage medium), and an ancillary flash memory 44 (for example, a non-volatile computer-readable storage medium). The ancillary memory 42 may include a program storage area (for example, read only memory (ROM)) and a data storage area (for example, random access memory (RAM)), and another non-transitory computer readable medium. The ancillary flash memory 44 is a non-volatile, electrically-rewritable computer storage medium, which includes a bootloader 46 and an ancillary operating system 48. In some embodiments, all or part of the bootloader 46 may be stored in a read only memory of the ancillary memory 42.

The ancillary electronic processor 40 and the high-level electronic processor 24 operate similarly to boot their respective operating systems.

In one embodiment, the ancillary operating system 48 contains software to allow the two-system device 10 to communicate over a land mobile radio network. In some embodiments, the ancillary operating system 48 is a real-time operating system (RTOS). Similar to the high-level embedded system 12, before the ancillary embedded system 14 can be used, it must boot. The boot time for the ancillary operating system 48 may be much shorter than the boot time for the high-level operating system 38. In some embodiments, for example, the boot time for the ancillary operating system 48 may be between three and seven seconds.

When the two-system device 10 is powered up, both the high-level embedded system 12 and the ancillary embedded system 14 start their start-up routines (that is, initialization). Before either of the embedded systems and its respective functions can be used, it must complete start-up. The start-up routines for the embedded systems include the booting of the processor and the loading of their respective operating systems. As noted above, the ancillary operating system 48 may boot up significantly faster than the high-level operating system 38. In one exemplary embodiment, the start-up for the ancillary embedded system 14 completes well before the start-up for the high-level embedded system 12. As a consequence, the two-system device 10 can provide some user functions (for example, land-mobile radio network communications) before the functions of the high-level operating system 38 are available via the main display 20, including the ability to display the status of the ancillary embedded system 14. Because the high-level embedded system 12 controls the main display 20, and the high-level embedded system 12 has not completed start-up, a user of the two-system device 10 would be unaware of the land-mobile radio user function status (for example, whether it is available for use) or mode settings (for example, the channel or talk group settings).

Figure 2:
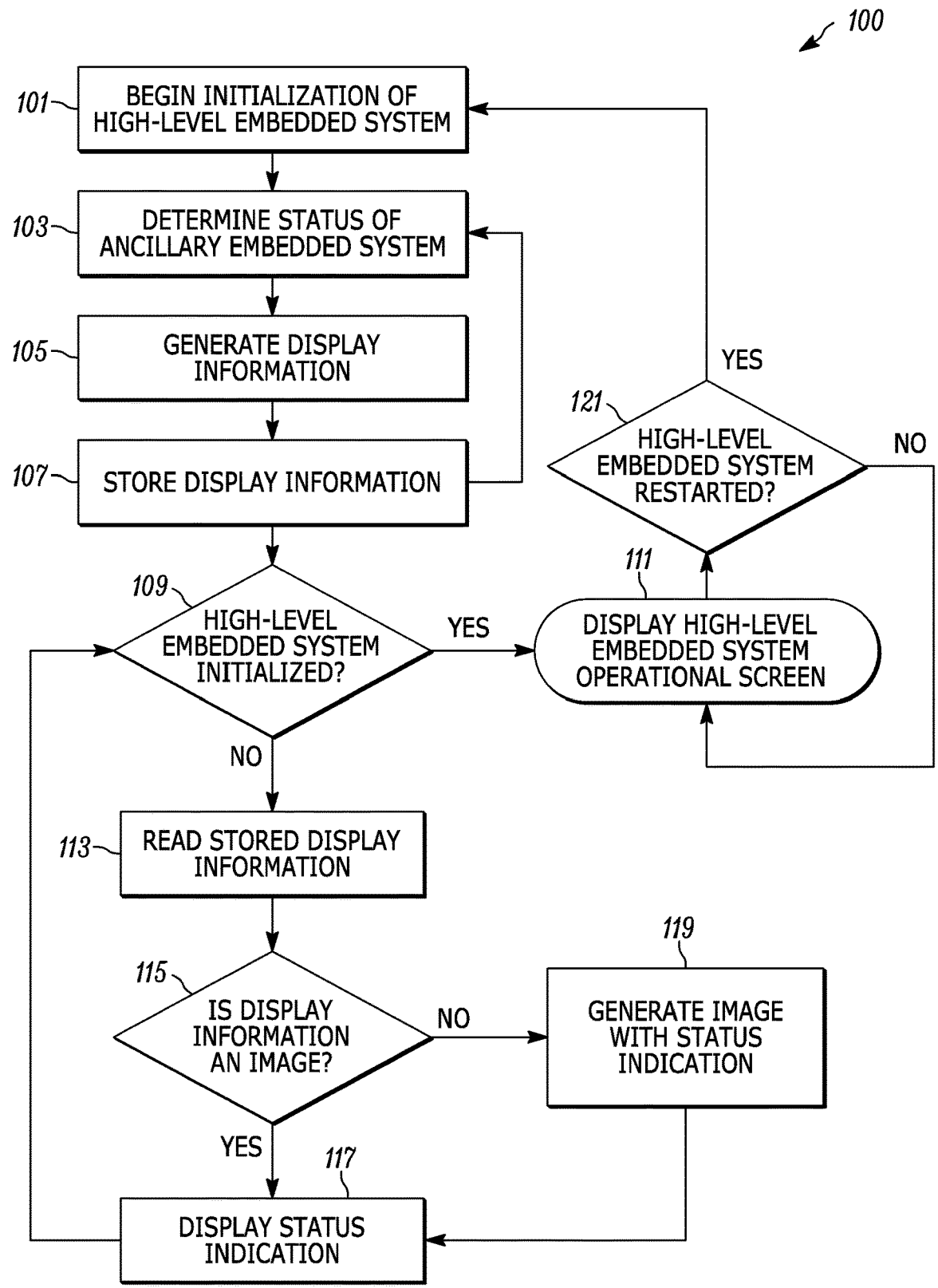
FIG. 2 is a flowchart of a method of indicating the status of an ancillary system in accordance with some embodiments.

FIG. 2 illustrates a method 100 for indicating the status of the ancillary embedded system 14 before the high-level embedded system 12 has completed its start-up. Portions of method 100, described herein as being performed by the ancillary embedded system 14, may be performed by the bootloader 46, the ancillary operating system 48, or a combination of both.

At block 101, the high-level embedded system 12 begins its initialization. Initialization may begin as a result of the two-system device 10 powering up. Initialization may also begin as a result of the high-level embedded system 12 restarting (for example, a self-restart as the result of an error or fault condition), a user-requested reboot, or some other cause. In cases where the initialization is the result of the two-system device 10 powering up, the initialization of the ancillary embedded system 14 will begin simultaneously. In other cases, the ancillary embedded system 14 may already be operating (e.g., in the event of a self-restart of the high-level embedded system 12).

At block 103, the ancillary embedded system 14 determines a status indication for itself The status indication for the ancillary embedded system 14 may include, for example, whether the land-mobile radio network is available for use, what modes are active, and what channels are active or available. For example, the status indication may include a flag indicating the land-mobile radio system is booted up, a listing of mode numbers, and a listing of channel numbers. At block 105, the ancillary embedded system 14 generates a set of display information that includes the status indication of the ancillary embedded system 14 in a format readable by the high-level embedded system 12. In some embodiments, generating the display information includes generating a display image. The display image may be, for example, a bitmap image containing a status indication for the ancillary embedded system 14 in a alphanumeric format, a graphical format (for example, icons), or a combination of both. The display image provides a visual indication of the status indication to users of the two-system device 10. At block 107, the ancillary embedded system 14 transfers the display information to the high-level embedded system 12 via the inter-processor communication data link 22. Alternatively, the ancillary embedded system 14 stores the display information in the shared memory 16, where it can be read by the high-level embedded system 12. In some embodiments, the method 100 may not start with beginning the initialization of the high-level embedded system 12 at block 101. For example, when the high-level embedded system 12 undergoes a self-restart and the ancillary embedded system 14 is still running, blocks 103, 105, and/or 107 may be performed one or more times before the high-level embedded system 12 begins its initialization at block 101.

As illustrated in FIG. 2, blocks 103 through 107 may repeatedly execute in parallel with other system operations to periodically and continuously update the display information stored in the shared memory 16. In alternative embodiments, blocks 103 through 107 may be event-triggered. For example, the status indication may be determined and stored when the ancillary embedded system 14 enters its operational mode.

At block 109, the enhanced bootloader 36 determines whether initialization of the high-level embedded system 12 is complete. The high-level embedded system 12 is initialized when the high-level operating system 38 has booted up and the high-level embedded system 12 is ready to operate. When it is initialized, the high-level operating system 38 displays its ordinary operational screen on the main display 20, at block 111. In some embodiments, the ordinary operational screen may include a default menu screen or a default application screen associated with a default application of the high-level embedded system 12. For example, the default application upon start-up of system 12 may be a land mobile dispatch application used to primarily control the ancillary system 14.

When the enhanced bootloader 36 determines that the high-level embedded system 12 is not initialized, the enhanced bootloader 36 reads the stored display information from the inter-processor communication data link 22, at block 113. Alternatively, the enhanced bootloader 36 reads the stored display information from the shared memory 16. At block 115, the enhanced bootloader 36 determines whether the display information is a display image. When, as described above, the ancillary embedded system 14 has stored the display information as a display image, the enhanced bootloader 36 will display the status indication for the ancillary embedded system 14 by rendering the image on the main display 20, at block 117. When the display information is not in the form of a display image, the enhanced bootloader 36 will use the display information to generate a display image including a status indication for the ancillary embedded system 14, at block 119. The enhanced bootloader 36 then displays the status indication for the ancillary embedded system 14 by rendering the image on the main display 20, at block 117.

Whether the display image is created by the ancillary embedded system 14 or the enhanced bootloader 36, the enhanced bootloader 36 renders the display image by placing it in the ancillary segment 34 of the display memory 30 of the high-level electronic processor 24. The enhanced bootloader 36 also renders a high-level display image for the high-level embedded system 12 by placing the high-level display image in the high-level segment 32 of the display memory 30 of the high-level electronic processor 24. The high-level display image includes information relating to the high-level embedded system 12 (e.g., the boot status of the high-level operating system 38). In some embodiments, the enhanced bootloader 36 renders and displays on the main display 20 a splash screen made up of multiple sections, stored in the display memory 30. In one example, a first section is the high-level display image for the high-level embedded system 12, and a second section is the display image for the ancillary embedded system 14. A splash screen is a graphical presentation that appears while the operating system is initializing. The splash screen may provide feedback, such as a status bar or other indicator, on the status of the operating system. In embodiments described herein, a splash screen may be used to display status for the high-level embedded system 12, the ancillary embedded system 14, or both.

Figure 3A:
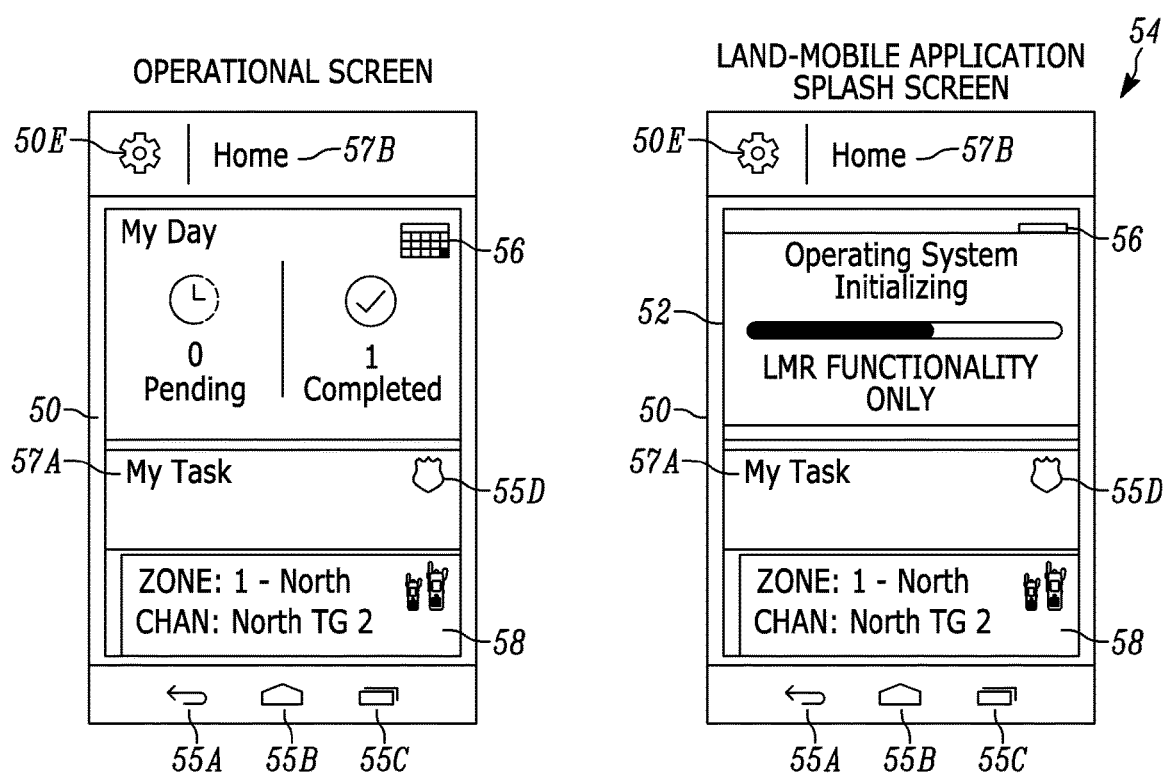
FIG. 3A and FIG. 3B illustrate graphical displays in accordance with some embodiments.

In one exemplary embodiment, illustrated in FIG. 3A, an operational screen 50 from a land-mobile radio dispatch application and the high-level display image 52 are used to create a land-mobile application splash screen 54. In some embodiments, the operational screen 50 includes icons 55A, 55B, 55C, 55D, 55E, calendar icon 56, text labels 57A, 57B, and a status indication 58 for the land-mobile radio. The icons 55A, 55B, 55C, 55D, 55E, 55F are used to access or indicate functions of the high-level embedded system 12. The text labels 57A, 57B label portions of the application interface. The status indication 58 shows the Zone and Channel information for the land-mobile radio. The enhanced bootloader 36 stores the high-level display image 52 in the high-level segment 32, and the operational screen 50 in the ancillary segment 34, and renders both as the land-mobile application splash screen 54 on the main display 20. The land-mobile application splash screen 54 is substantially similar in appearance to the operational screen 50. For example, as illustrated, the land-mobile application splash screen 54 mimics the operational screen 50. The land-mobile application splash screen 54 includes similar colors, layout, icons, and features as the operational screen 50. For example, as illustrated in FIG. 3A, the icons 55A, 55B, 55C, 55D, 55E, text labels 57A, 57B, and status indication 58 appear in the same place in the land-mobile application splash screen 54 and the operational screen 50. The high-level display image 52 appears as a pop-up window partially covering the operational screen 50. This gives the appearance that the land-mobile radio dispatch application is already running, but with land-mobile radio access only (that is, no access to high-level operating system 38 functionality). As illustrated in FIG. 3A, the high-level display image 52 partially or completely covers on-screen interface objects, for example, the calendar icon 56, for the land-mobile radio dispatch application, which is available only when the high-level embedded system 12 has completed start-up. Additionally, because the high-level embedded system 12 has not completed startup, some of the on-screen interface objects, for example, the icons 55A, 55B, 55C, 55D, 55E, are not selectable because their functions are not available. In some embodiments, certain on-screen interface objects are selectable if their functions are available (for example, a graphical push-to-talk button to activate land-mobile radio communications). In this embodiment, when the high-level embedded system 12 completes startup, it will display the operational screen 50 at block 111. From the standpoint of the user, it appears as if the operational screen 50 was present from the start, was covered by the high-level display image 52 for a time, and is now fully operable. Accordingly, this embodiment provides a seamless transition from the land-mobile application splash screen 54 to the operational screen 50, thereby providing a consistent look and feel to a user of the two-system device 10.

Figure 3B:
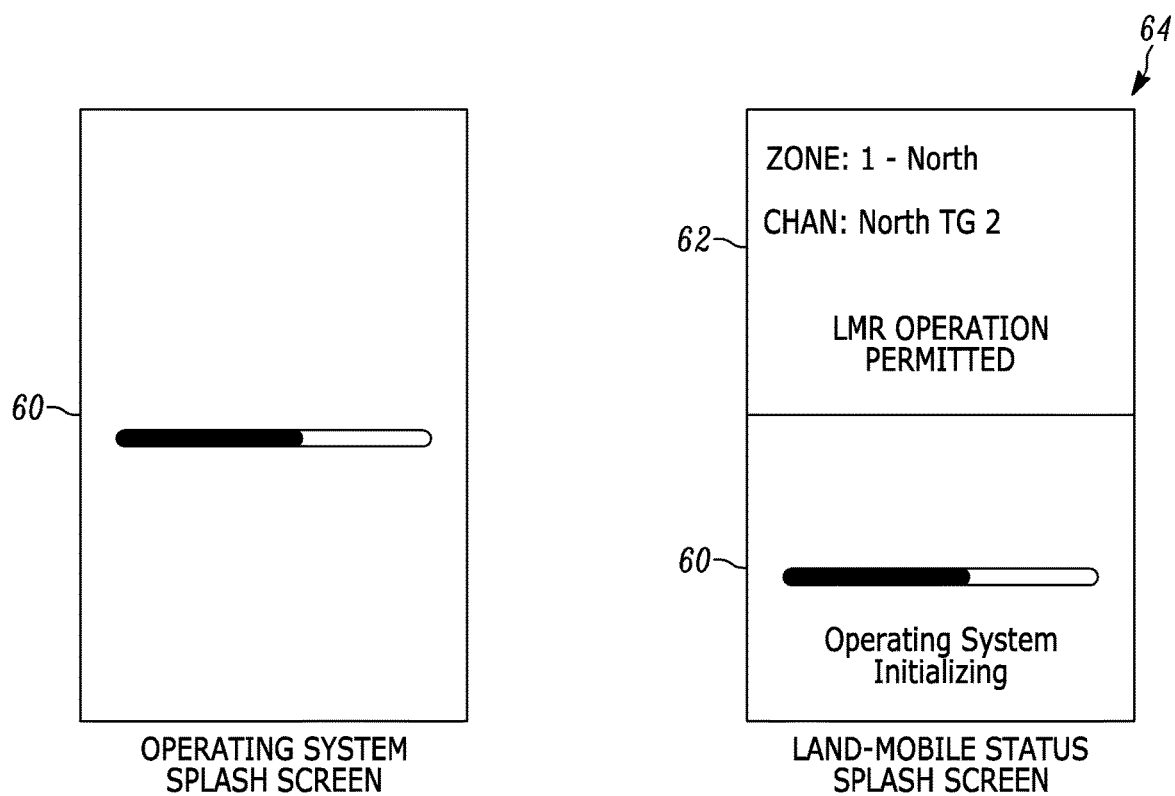

In a second exemplary embodiment, illustrated in FIG. 3B, the enhanced bootloader 36 combines a high-level operating system splash screen 60 and a land-mobile real time state display image 62 to create a land-mobile status splash screen 64. The operating system splash screen 60 displays the boot status of the high-level operating system 38. The land-mobile real time state display image 62 includes the status indication for the ancillary embedded system 14 (for example, a land-mobile radio system). The enhanced bootloader 36 stores the operating system splash screen 60 in the high-level segment 32, and the land-mobile real time state display image 62 in the ancillary segment 34, and renders both as the land-mobile status splash screen 64 on the main display 20. This embodiment is used, for example, when the two-system device 10 would not power-up by default to a land-mobile radio application.

Regardless of how the status indication is displayed on the main display 20, the method 100 of FIG. 2 continues to block 109, where the enhanced bootloader 36 determines whether the high-level embedded system 12 is initialized. When the high-level embedded system 12 is not yet initialized, the enhanced bootloader 36 continues to read and display the status indication for the ancillary embedded system 14, at block 113. As noted above, some embodiments continuously update the display information. For example, a user may change a status (for example, by selecting a channel or a mode), or the ancillary embedded system 14 may report a status (for example, a signal strength or a connection status). Those status updates would be reflected in the updated display information retrieved over the interprocessor communication data link 22 or stored in memory 16 at blocks 103 through 107. The continuous reading and displaying of continuously updated display information provides the user of the two-system device 10 with real-time or near real-time updates on the status of the ancillary embedded system 14.

When initialization of the high-level embedded system 12 is completed, the high-level operating system 38 displays its ordinary operational screen on the main display 20, at block 111. At block 121, when the high-level embedded system 12 has not been restarted, the system continues to operate at block 111. However, when the high-level embedded system 12 restarts (for example, as a result of a reset), the method 100 begins again at block 101.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A device, comprising:
a user display;
a first embedded system running a first operating system, the first operating system having a first boot time; and
a second embedded system communicatively coupled to the first embedded system via an inter-processor communication (IPC) data link, the second embedded system running a second operating system having a second boot time, the second boot time being shorter than the first boot time;
wherein the second embedded system is configured to perform a user function after start-up of the second embedded system is complete,
the first embedded system is configured to receive a set of display information from the second embedded system over the IPC data link and cause the user display to display at least one status indication of the second embedded system based on the set of display information after the start-up of the second embedded system is complete and before start-up of the first embedded system is complete, and
the first embedded system is configured to cause the user display to display at least one on-screen interface object,
wherein the on-screen interface object is displayed and is not selectable during start-up of the first embedded system, and
wherein the on-screen interface object is displayed and is selectable after a start-up of the first embedded system is complete.

2. The device of claim 1, wherein the first embedded system is further configured to cause the user display to display real-time updates of the at least one status indication during start-up of the first embedded system.

3. The device of claim 1, wherein the first embedded system is configured to cause the user display to display the at least one status indication as at least part of a splash screen.

4. The device of claim 3, wherein the first embedded system is configured to cause the user display to display the splash screen partitioned into a plurality of sections with a first section displaying the at least one status indication of the first embedded system and with a second section displaying information associated with the second embedded system.

5. The device of claim 3, wherein the first embedded system is configured to cause the user display to display the splash screen that is substantially similar in appearance to an operational screen associated with the first embedded system.

6. The device of claim 5, wherein the first embedded system is configured to cause the user display to display the at least one status indication as a pop-up window at least partially covering on-screen interface objects of the operational screen associated with the first embedded system that are not available for use during the start-up of the first embedded system.

7. The device of claim 3, wherein the first embedded system is configured to cause the user display to display the splash screen as a partially functional operational screen associated with the first embedded system, wherein on-screen interface objects that are not available for use during start-up of the first embedded system are not selectable, and wherein on-screen interface objects that are available for use during start-up of the first embedded system are selectable.

8. The device of claim 1, wherein the first embedded system is configured to cause the user display to display the at least one status indication of the second embedded system by causing the user display to display an on-screen image generated by the second embedded system.

9. The device of claim 1, wherein the user function of the second embedded system is available for use after the start-up of the second embedded system is complete and before the start-up of the first embedded system is complete.

10. The device of claim 9, wherein the at least one status indication provides a visual indication that the user function is available for use.

11. The device of claim 1, wherein the second embedded system includes a land-mobile radio modem.

12. The device of claim 11, wherein the at least one status indication displayed on the user display includes a mode number of the land-mobile radio modem.

13. The device of claim 12, further comprising a push-to-talk button, wherein the second embedded system is configured to operate the land-mobile radio modem based on selective activation of the push-to-talk button after the start-up of the second embedded system is complete, and wherein the first embedded system is configured to provide additional user interface and data access functionality through the user display after the start-up of the first embedded system is complete.

14. The device of claim 1, wherein the first embedded system is configured to initiate a system restart in response to a fault condition, and wherein the first embedded system is configured to cause the user display to display the at least one status indication of the second embedded system during the system restart of the first embedded system.

15. A method for indicating a status of an ancillary embedded system in an electronic device, the method comprising:
starting an initialization process of a high-level embedded system;
determining at least one status of the ancillary embedded system;
generating a set of display information for the at least one status of the ancillary embedded system;
transferring the set of display information from the ancillary embedded system to the high-level embedded system over an inter-processor communication (IPC) data link;
storing the set of display information in a manner retrievable by the high-level embedded system;
during the initialization process of the high-level embedded system, reading the stored set of display information;
displaying on a user display an indication of the at least one status of the ancillary embedded system based on the set of display information prior to completion of the initialization process by the high-level embedded system;
displaying on the user display, prior to completion of the initialization process by the high-level embedded system, at least one on-screen interface object, wherein the at-least one on-screen interface object is not selectable prior to completion of the initialization process by the high-level embedded system; and
displaying on the user display, after completion of the initialization process of the high-level embedded system, the at least one on-screen interface object, wherein the at least one on-screen interface object is selectable after completion of the initialization process of the high-level embedded system.

16. The method of claim 15, further comprising:
periodically updating the stored set of display information by the ancillary embedded system to provide a real-time indication of status; and
periodically updating the set of display information on the user display by the high-level embedded system during power initialization of the high-level embedded system.

17. The method of claim 15, wherein storing the set of display information includes storing the set of display information from the ancillary embedded system to a memory device commonly accessible by the high-level embedded system.

18. The method of claim 15, further comprising displaying an initialization status of the high-level embedded system on the user display in a manner spatially distinct from the displayed set of display information for the at least one status of the ancillary embedded system.

19. The method of claim 15, further comprising displaying a splash screen that is substantially similar in appearance to an operational screen of the high-level embedded system, wherein the displayed splash screen provides an indication of the at least one status of the ancillary embedded system based on the set of display information.

* * * * *